Figure 1:
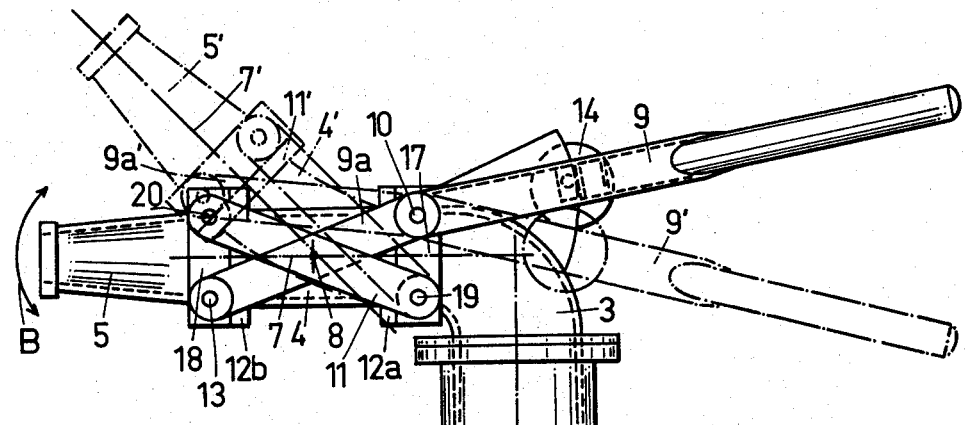

March 19, 1963  H. BAMMANN  3,081,953
SPRAY HEAD FOR HIGH-PRESSURE FLUIDS
Filed Feb. 15, 1962

HEINRICH BAMMANN
INVENTOR.

BY

AGENT

3,081,953
SPRAY HEAD FOR HIGH-PRESSURE FLUIDS
Heinrich Bammann, Zeven, Bremen, Germany
Filed Feb. 15, 1962, Ser. No. 173,410
Claims priority, application Germany Feb. 17, 1961
5 Claims. (Cl. 239—588)

My present invention relates to a spray head connectable to a source of water or other fluid under high pressure and provided with a nozzle for discharging a stream thereof in various directions.

Spray heads of universal mobility are used, for example, in the flushing of piles of agricultural produce (e.g. sugar beets) from their dumping place into conveying channels for further processing. Similar techniques are employed in the unloading of produce from transport vehicles.

The desire for two degrees of mobility has in the past led to constructions wherein, at least in some positions of the swivelable nozzle, the reaction from the high-pressure spray gives rise to strong moments about the axis of the inlet pipe, with resulting spontaneous rotation of the nozzle involving the danger of damage to surrounding objects, or even injury to the operator, unless cumbersome locking devices are relied on to immobilize the head in a selected position. Such immobilization, of course, defeats the purpose of ready adjustablity of the nozzle and, in addition, necessitates rather complex structures.

It is, therefore, the general object of my present invention to provide an improved spray head with universal nozzle mobility in which the above disadvantages are avoided.

A more particular object of this invention is the provision of simple means in such spray head for so controlling the movement of its nozzle that the nozzle axis remains coplanar with the axis of rotation of an intermediate elbow about an inlet pipe as it swings in the common axial plane of the pipe and the elbow about a substantially fixed fulcrum on the axis of the elbow outlet.

In accordance with this invention I provide, between a tubular member such as the aforesaid elbow and a nozzle movable in an axial plane thereof, a flexible sleeve connecting the outlet of the tube with the inlet of the nozzle and, in combination therewith, a linkage including a rigid element which is articulated to the tube near its outlet and to the nozzle near its inlet, this linkage enabling the nozzle to be oriented in different directions within the aforesaid axial plane while maintaining the nozzle axis substantially aligned with a point located approximately midway along the flexible sleeve.

In a preferred embodiment the linkage further includes another rigid element which intersects the first-mentioned element while being also pivoted to the tube outlet and to the nozzle inlet, e.g. to respective flanges thereon; the two elements are advantageously of the same length whereby the virtual fulcrum of the nozzle swing becomes the center of a rectangle, substantially coinciding with the longitudinal axial plane of the sleeve, in a normal coaxial position of alignment of the relatively swingable and deformable parts.

The linkage is preferably duplicated on opposite sides of the sleeve, with two corresponding elements thereof constituted by the arms of a bifurcated extremity of a lever pivoted on the elbow. The other end of the lever may then conveniently be used as an operating angle for the linkage and may be provided with detent means for selectively retaining the nozzle in different positions if such retention should be desired.

Figure 2:
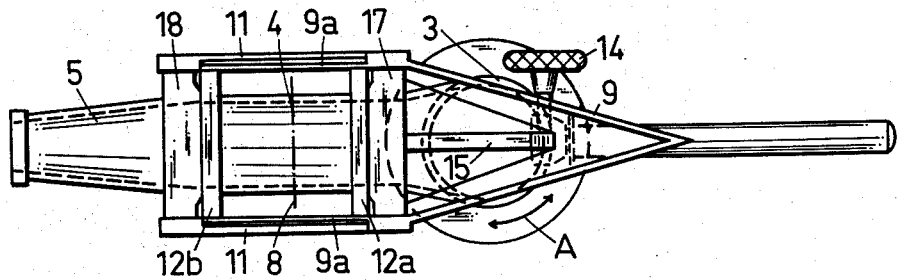

The invention will be described in greater detail with reference to the accompanying drawing in which:

FIG. 1 is a side-elevational view of a spray head representing a preferred embodiment; and
FIG. 2 is a top view of the spray head of FIG. 1.

The spray head shown in the drawing, adapted for example to flush heaped sugar beets or the like, comprises essentially an inlet pipe 1 provided with a coupling 6, e.g. of the bayonet type, for attaching it to a source of water under high pressure such as a standpipe 16; an elbow 3 swingable about the vertical axis 2 of pipes 1 and 16 as indicated by the arrow A in FIG. 2; a flexible sleeve 4 having two flanges 12a and 12b, the flange 12a being joined to a flange 17 of elbow 3 while the flange 12b is similarly joined to a flange 18 of a spray nozzle 5; and a linkage hereinafter described for swinging the nozzle 5, with deformation of the flexible sleeve 4, about a virtual fulcrum 8 represented by a line which extends transversely to the common axial plane of elements 1 and 3–5 while traversing the nozzle axis 7 in the position of FIG. 1, this swinging of the nozzle 5 being instituted by an arrow B in that figure.

The linkage previously referred to includes a two-armed lever 9 which has a bifurcated extremity 9a, straddling the sleeve 4, and another extremity pointing away from nozzle 5 to serve as a handle. Each of the arms 9a is pivoted to the flange 17 at a first fulcrum 10 and to the flange 18 at a second fulcrum 13; a pair of rigid links 11, of the same length as the arms 9a, intersect the latter and are pivoted to the flanges 17 and 18 at a third fulcrum 19 and a fourth fulcrum 20, respectively. The two pairs of fulcra 10, 20 and 13, 19, disposed on opposite sides of axis 7 as viewed in FIG. 1, constitute the four corners of a quadrangle which is a rectangle in the position of FIG. 1 wherein the nozzle axis 7 coincides with the axis of the outlet of elbow 3; the two elements 9a and 11 on each side of sleeve 4 extend along the diagonals of the rectangle and define at their intersections the virtual axis of rotation 8 of the nozzle 5. The elbow 3 is formed with an upstanding rib 15 engageable by a locking screw 14 on the lever 9 for optionally retaining the latter, and thereby the nozzle 5, in a vertical position of adjustment.

In FIG. 1 I have illustrated in dot-dash lines an alternate position of lever 9, sleeve 4 and nozzle 5 in which these elements, along with their links 9a and 11, have been designated by primed numerals. It will be noted that, whereas the arms 9a' of lever 9' and the links 11' no longer define the diagonals of a rectangle, the axis 7' of nozzle 5' still passes very close to the virtual fulcrum 8 while having remained in the axial plane of nipple 1 and elbow 3. Thus, there exists no appreciable moment arm which would tend to deflect the nozzle from the solid-line position into its dot-dash-line position or vice versa, hence the selected nozzle position is exceedingly stable against the reaction from high-pressure water streams.

I have found, surprisingly enough, that the almost perfect alignment between the nozzle axis and the point of intersection of pivotal axis 8 with the aforementioned axial plane, within the confines of the linkage 9a, 11, remains true over a relatively wide angle of swing for the nozzle 5.

The deformable sleeve 4 may be a rubber hose or any other flexible tubing including, for example, a jointed steel sheath.

Modifications of the structure described and illustrated are, of course, possible without departing from the spirit and scope of the invention as defined in the appended claims.

I claim:
1. A spray head for fluids under high pressure, comprising an inlet pipe connectable to a source of said fluid, a tubular elbow secured to said pipe with freedom of rotation about the pipe axis, a flexible sleeve connected with said elbow, a nozzle secured to said sleeve, said nozzle having an axis coplanar with said pipe axis, and rigid link means articulated to said nozzle and said elbow for enabling the swinging of said nozzle in a common axial plane of said elbow, said nozzle and said pipe about a substantially fixed point in said plane approximately in line with the nozzle axis, said point being located substantially midway along said sleeve.

2. A conduit for fluids under high pressure, comprising a first tubular member, a second tubular member in general alignment with said first member, a flexible sleeve interconnecting said members, and a pair of rigid links of identical length intersectingly disposed alongside said sleeve while being pivoted to said members along the corners of a quadrangle of which said links form the diagonals whereby said members are relatively swingable in a common axial plane about a fulcrum substantially coinciding with the intersection of said diagonals, said quadrangle being a rectangle in a coaxial position of said members.

3. A spray head for fluids under high pressure, comprising a tubular member connectable to a source of said fluid, a flexible sleeve connected with said member, a nozzle secured to said sleeve, and rigid link means articulated to said nozzle and said member for enabling the swinging of said nozzle in a common axial plane of said nozzle and said member about a substantially fixed point in said plane approximately in line with the nozzle axis, said member and said nozzle being respectively provided with first and second fulcra for said link means forming pivotal axes transverse to said plane on opposite sides of said nozzle axis, said member and said nozzle further comprising third and fourth fulcra, respectively, defining with said first and second fulcra a rectangle in a predetermined position of alignment between said nozzle and said member, said link means including a first rigid element extending diagonally from said first to said second fulcrum and a second rigid element extending diagonally from said third to said fourth fulcrum in intersecting relationship with said first element, said first element being provided with an extension forming a handle for the displacement of said nozzle relative to said member.

4. A spray head for fluids under high pressure, comprising an inlet pipe connectable to a source of said fluid, a tubular elbow secured to said pipe with freedom of rotation about the pipe axis, a flexible sleeve connected with said elbow, a nozzle secured to said sleeve, said nozzle having an axis coplanar with said pipe axis, and rigid link means articulated to said nozzle and said elbow for enabling the swinging of said nozzle in a common axial plane of said elbow, said nozzle and said pipe about a substantially fixed point in said plane approximately in line with the nozzle axis, said point being located substantially midway along said sleeve, said elbow and said nozzle being provided with respective flanges adjoining said sleeve, said link means including a lever with a bifurcated extremity pivoted to the flange of said elbow at a first location on one side of said nozzle axis and to the flange of said nozzle at a second location on the other side of said nozzle axis for swinging movement in said plane, said link means further including a pair of elongated elements of substantially the same length as said arms pivoted to the flange of said elbow at a third location at said other side of said nozzle axis and to the flange of said nozzle at a fourth location at one side of said nozzle axis, said first, second, third and fourth locations defining the corners of a rectangle in a position of substantial axial alignment of said elbow and said nozzle, said elements respectively intersecting the arms of said bifurcated extremity adjacent diametrically opposite points of said sleeve, said lever having another extremity forming a handle remote from said nozzle.

5. A spray head for fluids under high pressure, comprising an inlet pipe connectable to a source of said fluid, a tubular elbow secured to said pipe with freedom of rotation about the pipe axis, a flexible sleeve connected with said elbow, a nozzle secured to said sleeve, said nozzle having an axis coplanar with said pipe axis, rigid link means articulated to said nozzle and said elbow for enabling the swinging of said nozzle in a common axial plane of said elbow, said nozzle and said pipe about a substantially fixed point in said plane approximately in line with the nozzle axis, said point being located substantially midway along said sleeve, said elbow and said nozzle being provided with respective flanges adjoining said sleeve, said link means including a lever with a bifurcated extremity pivoted to the flange of said elbow at a first location on one side of said nozzle axis and to the flange of said nozzle at a second location on the other side of said nozzle axis for swinging movement in said plane, said link means further including a pair of elongated elements of substantially the same length as said arms pivoted to the flange of said elbow at a third location at said other side of said nozzle axis and to the flange of said nozzle at a fourth location at one side of said nozzle axis, said first, second, third and fourth locations defining the corners of a rectangle in a position of substantial axial alignment of said elbow and said nozzle, said elements respectively intersecting the arms of said bifurcated extremity adjacent diametrically opposite points of said sleeve, said lever having another extremity forming a handle remote from said nozzle, and locking means engageable with said elbow for immobilizing said lever relatively to said elbow.

References Cited in the file of this patent

UNITED STATES PATENTS 2,738,226    Bals _____ Mar. 13, 1956

FOREIGN PATENTS 855,804    Germany _____ Nov. 17, 1952